INVENTOR:
Franz Litzka
BY
Ross & Mestern

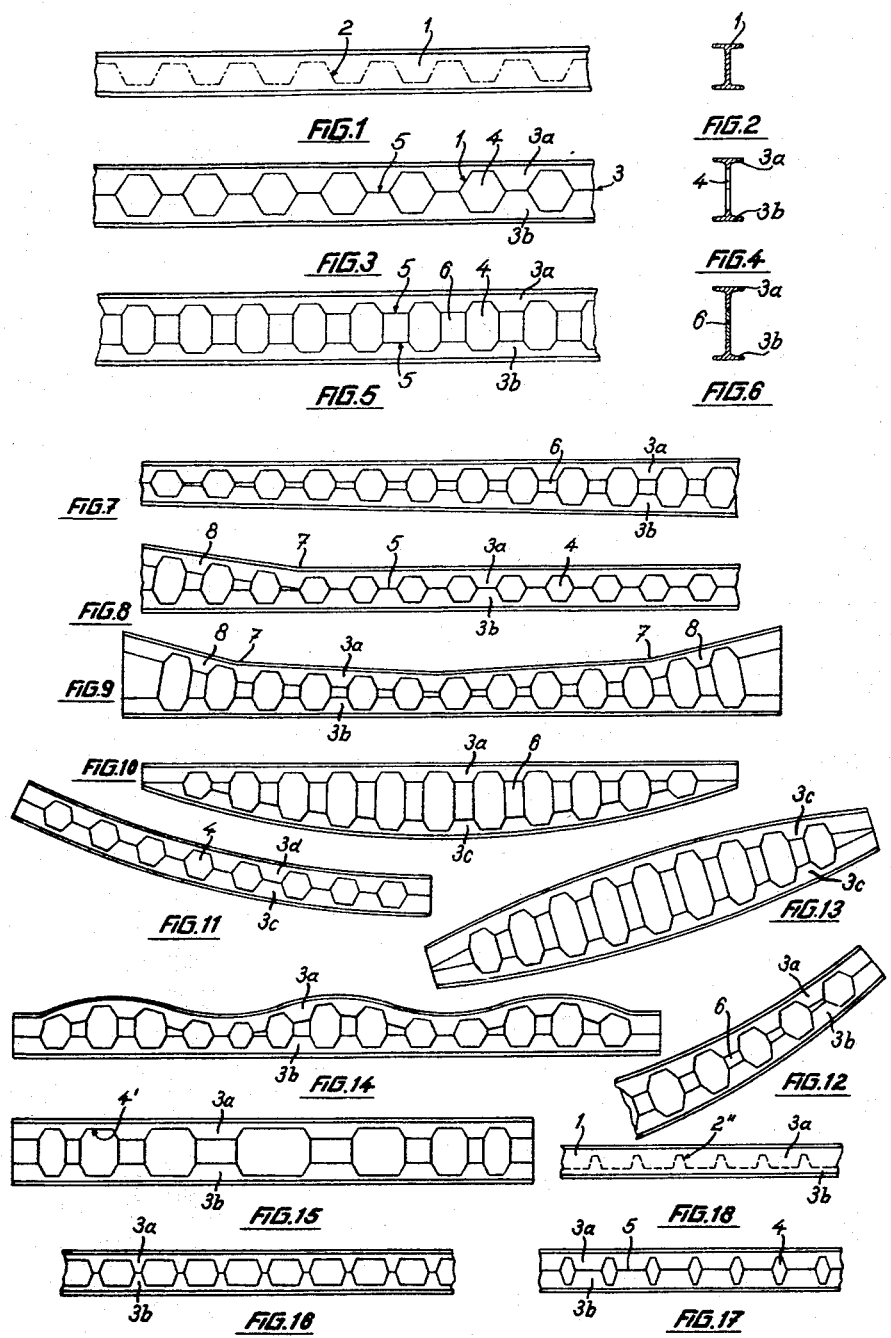

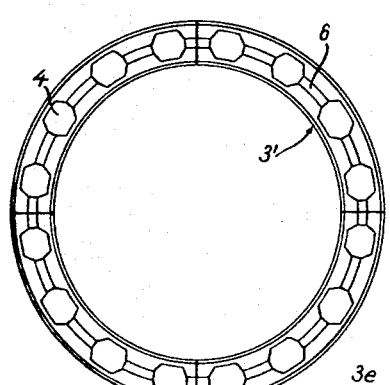
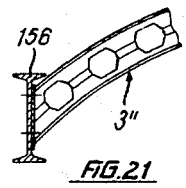
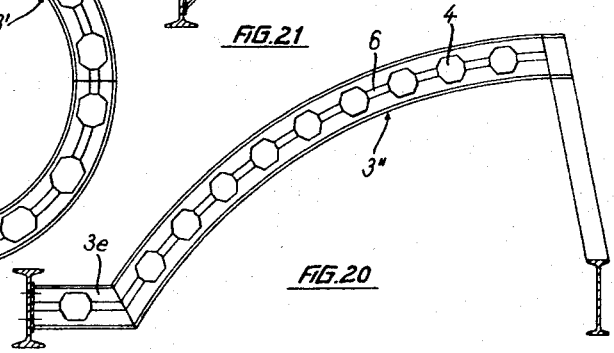
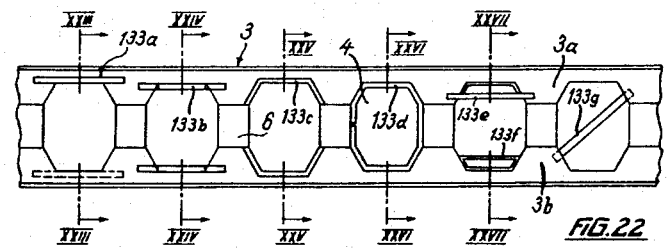
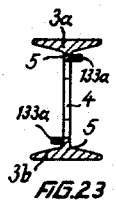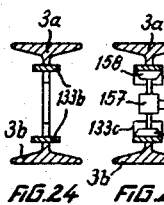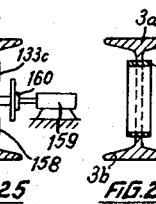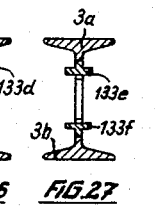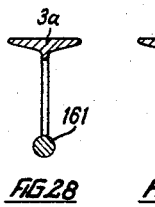
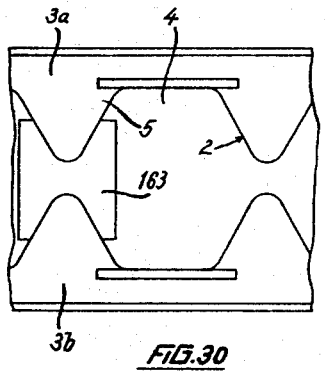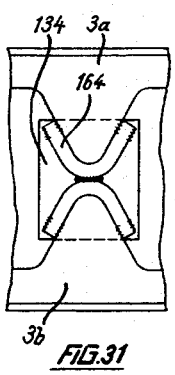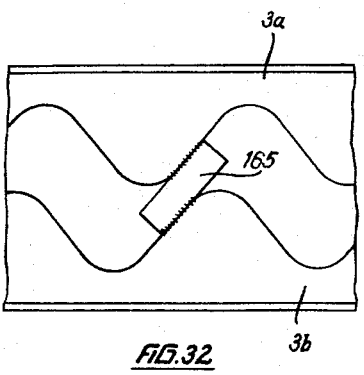
INVENTOR:
Franz Litzka
BY
Ross & Mestern Nov. 8, 1966   F. LITZKA   3,283,464
HONEYCOMB GIRDERS AND METHOD FOR MAKING SAME
Original Filed May 10, 1960   9 Sheets-Sheet 3

Nov. 8, 1966　　　　F. LITZKA　　　3,283,464
HONEYCOMB GIRDERS AND METHOD FOR MAKING SAME
Original Filed May 10, 1960　　　　　　　9 Sheets-Sheet 4
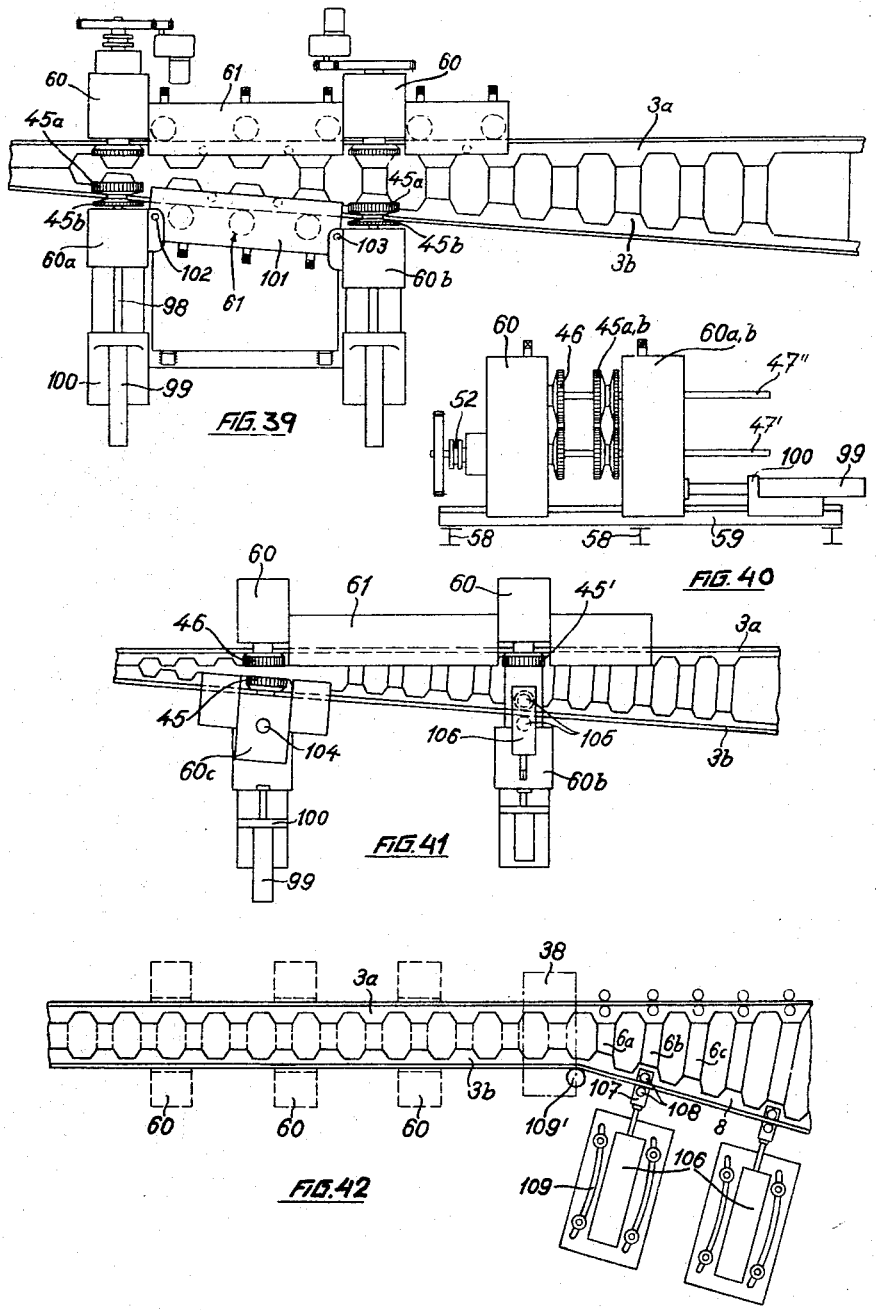
INVENTOR:
Franz Litzka
BY
Ross & Mestern Nov. 8, 1966     F. LITZKA     3,283,464
HONEYCOMB GIRDERS AND METHOD FOR MAKING SAME
Original Filed May 10, 1960     9 Sheets-Sheet 5
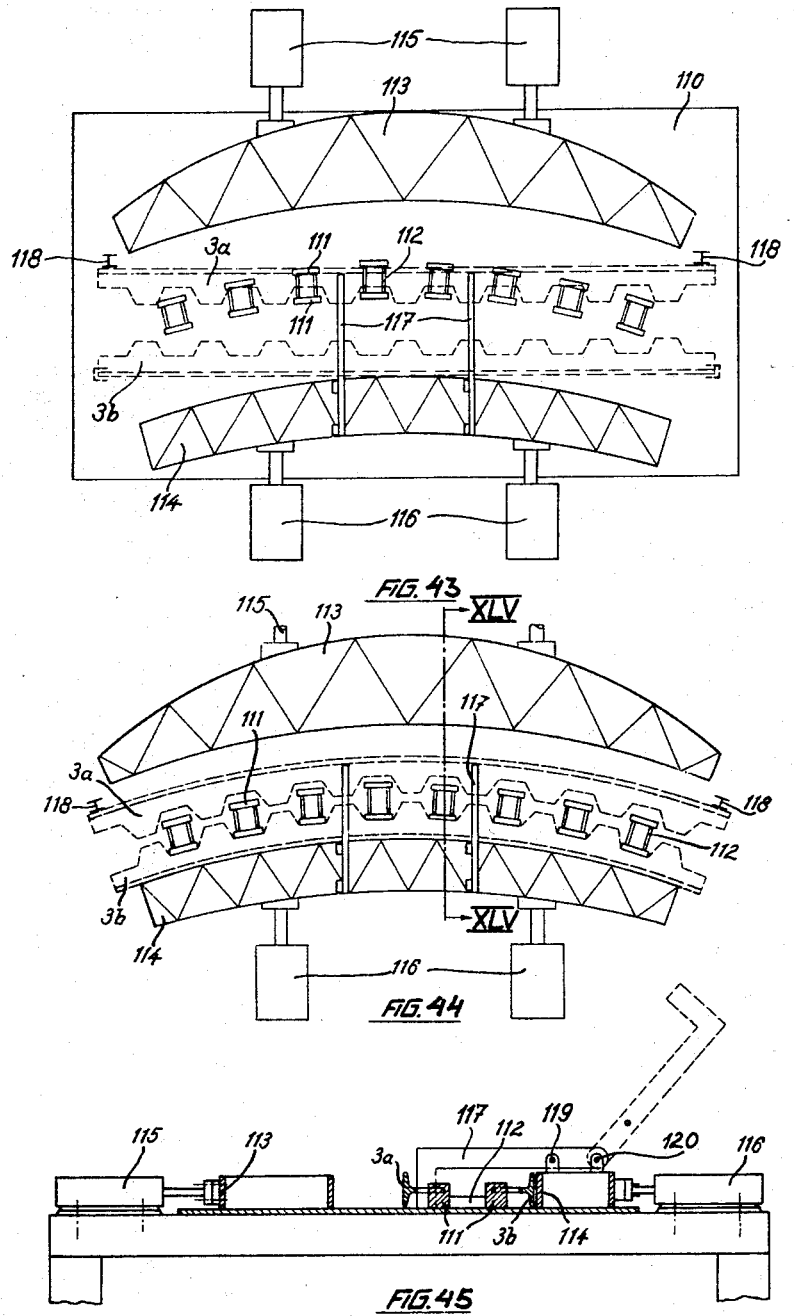
INVENTOR:
Franz Litzka
BY
Ross & Mestern

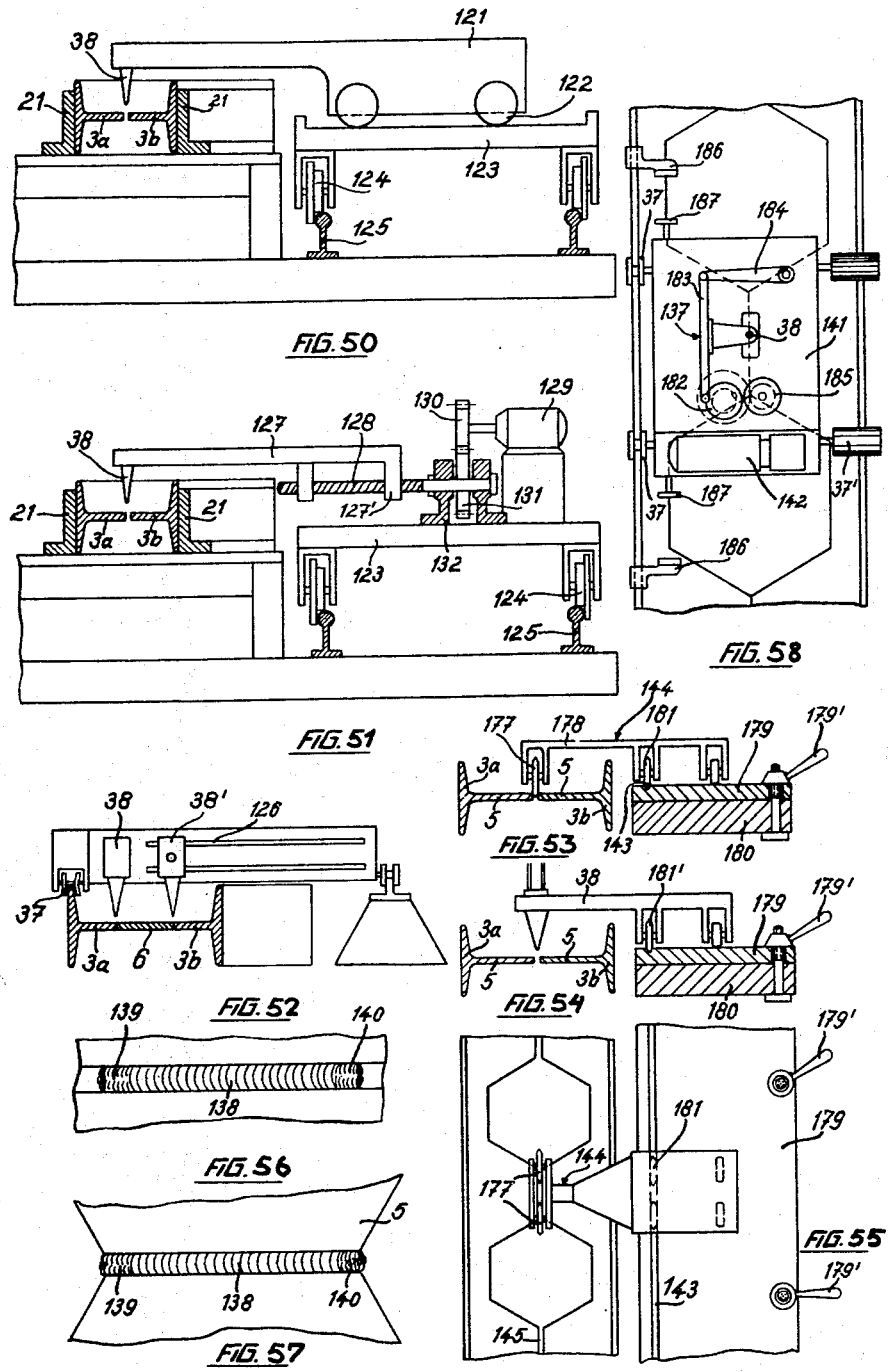

INVENTOR:
Franz Litzka

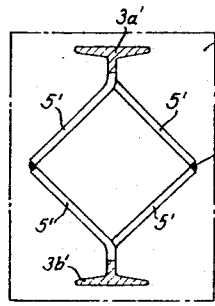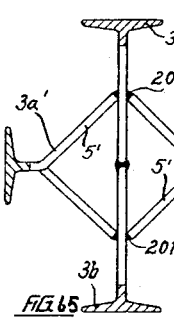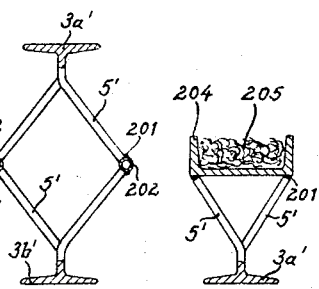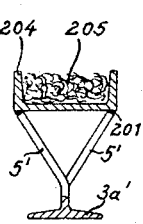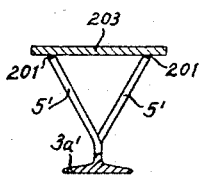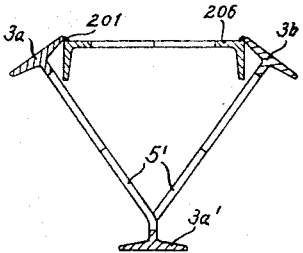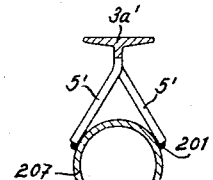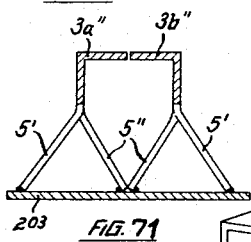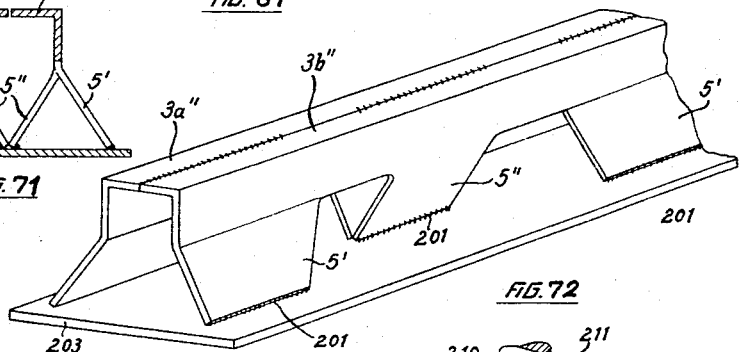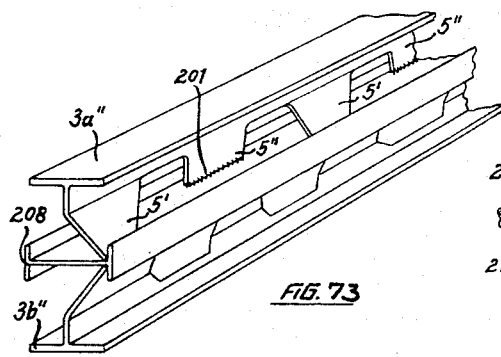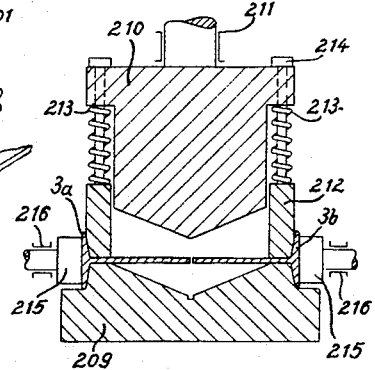

United States Patent Office 3,283,464
Patented Nov. 8, 1966

3,283,464
HONEYCOMB GIRDERS AND METHOD FOR MAKING SAME
Franz Litzka, Haus-Nr 29, Marktredwitz, Bavaria, Germany
Original application May 10, 1960, Ser. No. 28,054, now Patent No. 3,197,610, dated July 27, 1965. Divided and this application Oct. 19, 1964, Ser. No. 409,345
Claims priority, application Germany, May 13, 1959
L 33,217
8 Claims. (Cl. 52—636)

This application is a division of my application Ser. No. 28,054, filed May 10, 1960, now U.S. Patent No. 3,197,610 issued July 27, 1965.

The invention concerns the manufacture of honeycomb girders with improved load-bearing strength and to a method for producing such girders.

The invention moreover concerns the solution of the problem of aligning and guiding girder sections whose webs have a sawtooth-like configuration in such a manner that the webs can be welded together directly or via interposition web plates manually, semi- or fully automatically.

Such girder sections, the cross-section of which can have any configuration, are obtained by cutting the webs of solid girders, the cutting line extending approximately in the shape of a continuous undulation or saw-tooth line.

The separated girder sections are then relatively transposed along their longitudinal axes to the extent that the individual tooth-like projections of the web are situated opposite one another to enable the girder sections to be welded together at these projections. Hence honeycomb-like apertures are formed between the projections. Such honeycomb girders welded together and known per se are distinguished by a greater depth of web relative to that of the original solid web girder and consequently by greater bending strength. If a honeycomb girder is compared with a solid web girder of equal size it is ascertained that the honeycomb girder is substantially lighter and, owing to the saving in material, substantially less costly.

The separation of single-I section girders and the manual welding of the webs of these girder sections is known. The manual welding method however involves the considerable difficulty in that the separated girder sections lose their constancy of shape and have therefore to be welded together in an irregular state. The time required for alignment to straighten out the girder sections is so great that it is not possible to obtain a substantial saving in cost by comparison with normal I-shaped girders having a deep web.

An object of the present invention is to straighten, within a short time and in a simple manner, girder sections which are bent due to their separation and at the same time to effect the transposition of the individual girder sections thus making it possible for the straightened girder sections to be welded manually and also semi-automatically or fully automatically in a single operation.

According to the present invention a honeycomb girder comprises at least two girder sections interconnected by welding, which are formed by separating the web of a solid web girder along a line of toothed configuration, the two parts thus formed being welded together again after being shifted through about half a tooth length or undulation period the honeycomb girder can be provided with web extension plates welded between the respective webs of the two parts to increase the bearing strength of the girder and/or at least in part provided with a shape in which the flanges are curved or bent and/or deviate from their normal positions parallel to one another.

It is another object of the present invention to provide a method for producing honeycomb girders a solid web girder is severed along a line of toothed configuration, the two parts of the girder thus produced being transposed longitudinally relative to one another by a distance equal to approximately half a tooth spacing and welded together.

A further particularly advantageous step may consist in providing the under surfaces of the girder webs, at the beginning and/or end of the intended weld seam, with ledges or blocks of non-weldable material pressed thereagainst which, at least in the region of the welds, may have groove-like depressions to form the weld seams on the underside of the girder webs and also at the beginning and end of the weld seam.

The invention will be described further, by way of example, with reference to the accompanying drawing, in which FIGS. 1 and 3 are side-elevational views of known type honeycomb girders but constructed by the method of the instant invention;

FIGS. 2 and 4 are respective corresponding plan views;

FIGS. 5 and 7 to 18 are side-elevational views of girders which are constructed in accordance with the method of the invention, i.e. in honeycomb form;

FIG. 6 is a cross-section through the girder of FIG. 5;

FIG. 19 is a plan view of an example showing the use of a curved honeycomb girder;

FIG. 20 is a plan view, partly in section, showing a further example of the use of a curved honeycomb girder;

FIG. 21 is a fragmentary plan view, partly in section, of another example of the use of a honeycomb girder;

FIG. 22 is a plan view incorporating various types of honeycomb girders having additional bracing elements;

FIGS. 23 to 27 are sections on the lines XXIII—XXIII, XXIV—XXIV, XXV—XXV, XXVI—XXVI and XXVII—XXVII respectively of FIG. 22;

FIGS. 28 and 29 are cross-sections through a further honeycomb girder;

FIGS. 30 to 32 are partial elevational views of honeycomb girders having bracing elements acting as web plates;

FIG. 39 is a plan view showing a welding plant adapted to produce tapering honeycomb girders;

FIG. 40 is an end elevation taken from the left-hand side of FIG. 39;

FIG. 41 is a plan view of an alternative type of welding plant to the one shown in FIG. 39;

FIG. 42 is a diagrammatic plan of a welding plant for producing a honeycomb girder having a tapering rise at one end at least;

FIG. 43 is a plan showing an example of a welding plant adapted to produce curved honeycomb girders;

FIG. 44 is a corresponding elevation;

FIG. 45 is a corresponding cross-section;

FIGS. 50 to 52 are diagrammatic cross-sections through welding plants in which at least one welding head executes a movement at right angles to the longitudinal direction of movement;

FIGS. 53 and 54 are cross-sections showing a centering device, in two different positions, for the automatic adjustment of a welding head in relation to the correct position of the seam to be welded.

FIG. 55 is a plan corresponding to FIG. 53;

FIG. 56 is a diagrammatic plan of a weld seam;

FIG. 57 is a corresponding cross-section;

FIG. 58 is a plan of a welding device having a separate drive for a welding head;

FIGS. 64 to 71 are cross-sections of differing shapes of honeycomb girders, the web sections of which are chamfered at the side;

FIGS. 72 and 73 are perspective views of differing shapes of honeycomb girders, the web sections of which are chamfered at the side; and FIG. 74 is a cross-section through a pressing device for chamfering the web sections.

Figure 33:
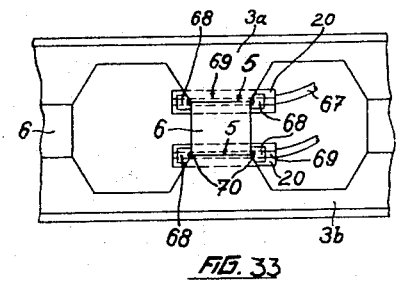
FIG. 33 is a plan view showing ledges of non-weldable material which are pressed against a girder web in the region of the welding point.

In the partly known honeycomb girder sections shown in FIGS. 1 to 18 it is assumed, by way of example, that a double T-shaped solid-webbed girder is used as the starting material which is processed to form double T-shaped honeycomb girders. It is thus also possible for other solid-web girder sections to be used, depending upon the section of a honeycomb girder to be produced.

In FIGS. 1 and 2 there is shown a known type of solid-web double T-section girder 1, the web of which is separated along an undulating or trapezoidal line 2.

Individual girder sections 3a and 3b are moved apart and then longitudinally transposed in such a manner that projecting web regions are oppositely disposed, the girder sections subsequently being welded together again at 5 to produce the openings or "honeycombs" 4. This manufacturing method is generally known but the technical accomplishment involves difficulties which have hitherto been practically impossible to overcome, as the separated girder sections 3a, 3b tend to become greatly distorted.

As shown in FIGS. 3 and 4 it is evident that the honeycomb girder 3 welded together in the above mentioned manner has a substantially greater overall depth than the double T-section girder shown in FIG. 2, although the weight of the girder 3 has remained the same. Due to the greater depth of web, the honeycomb girder 3 has a greater resistance to bending than the double T-section girder 1 (FIGS. 1 and 2) having a solid web.

In FIGS. 5 and 6 there is shown a girder having web plates 6 inserted between the girder sections 3a and 3b to further increase the depth of web, hence increasing the resistance to bending of the honeycomb girder 3. Welding together such girder sections 3a, 3b with interposed web plates 6 is hereinafter described as "indirect" welding of the girder sections 3a and 3b. When the web plates 6 are longer than the web sections 5 there is achieved a qualitatively better start and finish of the weld seam.

By successively increasing the lengths of the web plates 6 it is possible to produce tapering honeycomb girders of the type shown in FIG. 7.

In FIG. 8 there is shown a honeycomb girder having a tapering rise 8 imparted thereto at one or both ends, which rise starts at a region 7. The center zone of this girder can be of parallel design (FIG. 8) or of tapering design (FIG. 9).

In FIG. 10 there is shown a honeycomb girder composed of a straight girder section 3a and a curved girder section 3e, between which, web plates 6 are inserted. The curved girder section 3c may be produced by deforming a girder section 3b of the type shown in FIG. 3.

In FIG. 11 there is shown the possibility of both girder sections 3c and 3d being bent and welded together with or without web plates. The solid-webbed girder having a cutting line 2 (FIG. 1) of different periodic lengths is separated, the two periodic lengths in question being so dimensioned that they conform with the girder sections of the FIG. 11 embodiment curved with different radii. The upper girder sections having the greater periodic length than the lower girder sections of smaller periodic length are then welded together.

It is also possible to produce curved tapering honeycomb girders, in which the web plates 6, progressively increasing in length with respect to the depth of web, are welded between the girder sections 3a, 3b, in order to obtain a tapering effect. It is however also possible for both girder sections, obtained from a solid-web girder or strip metal, be welded together with the same graduation, since the differences in measurement resulting during the bending operation can be compensated by means of the web plates.

These methods of procedure, moreover, also make it possible to develop other honeycomb girder combinations, for example, as shown in FIGS. 13 and 14, in which the depth of web is greatest at the points where they are subjected to the greatest load.

Since it is possible during the separation of the solid-webbed girder to increase or reduce the individual the periodic length of the cutting line, honeycomb girders of the type shown in FIG. 15 may also be produced in which the honeycomb opening 4, at the points of maximum loading, have a small cross-section and at the other points have a greater cross-section.

An advantageous embodiment of honeycomb girder is shown in FIGS. 16 to 18, proceeding from the fact that two girders of equal depth of web but unequal bearing strength are to be produced. In this case a solid web girder as shown in FIG. 18 is cut along the line 2″, thus creating girder sections 3a, 3b of differing shape; the upper girder section 3a is welded to another similar upper girder section in mirror image and two lower girder sections 3b are interconnected in the same manner. Thus there are created honeycomb girders od the type shown in FIG. 16 having wide honeycombs 4 and consequently low bearing strength and honeycomb girders of the type shown in FIG. 17 having narrow honeycombs 4 and higher bearing strength. In this way a cutting operation is saved.

FIGS. 19 to 21 explain the significance of producing curved honeycomb girders.

As shown in FIG. 19 a circular girder 3′ is constructed from a plurality of honeycomb girders, for example, for supporting a gas boiler of any diameter.

The curved girder 3″ shown in FIG. 20 is particularly suitable for shed constructions or other unsupported roofs, it being advisable also to use curved tapering girders of the type shown in FIG. 12. The girder 3″ has a connecting part 3e welded thereon adapted to be flanged to other girders, e.g. stanchions. In the case of the girder shown in FIG. 21 the honeycomb girder 3″ is flanged to a cross-girder 156.

Honeycomb girders may advantageously be braced. As shown in FIGS. 22 to 27 it has been acknowledged that a noticeable increase of bearing strength can be achieved when the honeycomb girder 3, in the region of its weakened points (i.e. in the region of its honeycomb opening 4) is provided with additional bracing elements 133 welded thereon. Bump or bulge bracings have already been proposed. These are not however suitable to eliminate girder weakening due to the honeycombs. There will be described the procedure for bracing the honeycomb itself and/or to return it to a definite static shape.

For simplicity sake FIG. 22 shows several bracing alternatives which are detained in cross-section in FIGS. 23 to 27.

In the embodiment of FIG. 23 bracing elements 133a are of ledge-like design and welded flush against the webs 5 of the girder sections on the upper and lower edge of the honeycombs 4. Whether these elements 133a are arranged on one or the other side or on alternate sides can be left to the discretion of the manufacturer.

In the unit of FIG. 24 ledge-like bracing elements 133b are provided with slot-shaped recesses at both ends, the width of which corresponds to the thickness of the web of the individual girder sections 3a, 3b. The elements 133b are inserted obliquely in the honeycomb 4 and then displaced to the upper and/or lower edge of the honeycomb and finally welded to the girder web. The width of the recesses may be so selected that it corresponds to the maximum web thickness; if thinner webs are used at least one of the shanks defining the recess is laterally expanded to the dimension of the thickness of web provided.

Bracing elements 133c shown in FIG. 25 are formed in the shape of a honeycomb and on the one side are welded to the edge of the honeycomb and on the other side the end faces of the elements are supported against protruding points of the web plates 6 (FIG. 22). It is an advantage to make the web plates 6 longer than the leading edges of the girder webs, since in this case the welding head can be already ignited a short distance in front of the start of the web. In this manner there is obtained a very favourable start and termination of the weld seam. It is thus an advantage to insert the bracing elements 133c either as flat ledges or as pre-shaped yokes in the honeycombs 4 and to press them by means of double-acting pressure elements, e.g. presses 157, 158, against the edge of the honeycomb and to weld them there. The elements are thus provided with a pre-tension which counteracts the bearing force. It is also advisable to provide a further lifting cylinder 159, 160 which carries the first cylinder 157, 158 and slides it into and out of the honeycomb 4. This step is of particular advantage in automatic girder production. Instead of the ledge-shaped yokes 133c it is also possible to use other profiles, e.g. round bars, rods, tubes etc.

In the example shown in FIG. 26 a bracing element 133d acts over the whole edge of the honeycomb 4 and hence provides an extremely high bracing effect.

Bracing elements 133e and 133f shown in FIGS. 22 and 27 have a T-shaped cross-section or a similar profile. The element 133e, in the manner shown in FIG. 24 is designed with recesses on either side of the T-shaped flange whereas the element 133f is inserted in the honeycomb and welded to the honeycomb edge. In both instances it is advisable to chamfer the T web of the element 133f, 133e, corresponding to the honeycomb shape.

It is also possible for the bracing elements 133g shown in FIG. 22 to be so arranged that they connect the two girder sections 3a, 3b in a strut-like manner. It is thus evident that there are numerous possibilities for additionally bracing a honeycomb girder and to prevent possible deformation of the web regions forming the honeycombs. It is advisable, in particular, to fit the bracings at the points of the girder most subjected to loading. Thus, for example, bracings arranged in the center of the girder act as substitute for a barrel-shaped honeycomb girder. Bracings moreover make it possible to select smaller dimensions than necessary for the girder sections, as the bracings provide the necessary safety factor.

The fact that it is not necessary only to interconnect T-shaped girders is evident from the examples shown in FIGS. 28 and 29, in which it is shown that the lower chord is a solid or hollow round bar 161 or U-shaped profile 162 which, at the connecting points with the upper girder section 3a are inwardly expanded. Other profiles, e.g. L or Z-profiles or simple metal strips may be used for the constructed girder in accordance with the invention.

In the embodiments shown in FIGS. 30 to 32 are honeycomb girders in which the bracing elements 163 to 165 can replace the web plates 6. This is based on the fact that the cutting line 2 of the honeycomb girders extends in an undulatory manner so that the direct welding of the girder sections 3a, 3b provides too small a welding seam. The undulatory cutting line moreover provides the advantage that the individual girder section has a greater rigidity.

The bracing element 163 in the example shown in FIG. 30, embraces in a part region the edge of the web 5. In the case of FIG. 31 the ledge-like bracing element 164 is additionally welded to a bracing plate 134. As shown in FIG. 32 the girder sections 3a, 3b are somewhat laterally transposed so that the bracing element 165 is tangent to the edges of the web 5 and forms a wide bridge adapted to receive and transmit the load. Further advantageous girder shapes are shown in FIGS. 80 to 89.

The following explanations are concerned with illustrating the methods and apparati for producing honeycomb girders of any kind, more especially of the shape shown in FIGS. 1 to 32.

Figure 34:
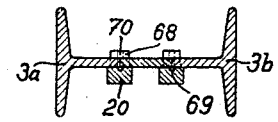
FIG. 34 is a corresponding cross-section.

Ledges or blocks of non-weldable material especially of copper, which are advantageous for forming the welding seam, are shown in FIGS. 33 and 34 and consist of two elongated ledges 20 which are pressed from below against the underside of the web of the girder sections 3a, 3b. At least one groove-like depression 69 is formed in the surface of those ledges 20 which is located in register beneath the welding point 5 (FIG. 3). When depressions 69 have been formed in all four longitudinal sides of the ledges 20 it is possible, by twisting the ledges 20 for the use of new ledges to be avoided by closing one depression. Blocks 68 abut against these elongated ledges 20 which strike against the front and rear end face of the web. On the end face these blocks 68 are also provided with groove-like depressions 70, namely at the point where the welding seam starts and terminates. The ledges 20 may be cooled by cooling means via conduits 67.

Figure 35:
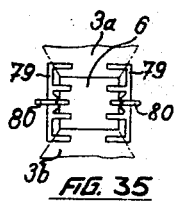
FIG. 35 is a plan view showing a supporting device for inserting web plates between the girder webs.
Figure 36:
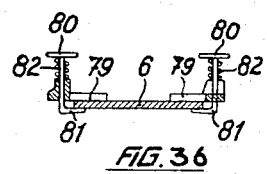
FIG. 36 is a corresponding cross-section.

The clamping device for holding the section comprises, as shown in FIGS. 35 and 36, conveniently a comb-shaped upper part 79, the outer prongs of which abut against the webs of the girder sections 3a and 3b. The web plate 6, shown separately in FIG. 36, is retained by a latch 80, 81, which is urged upwardly by means of the compression springs 82. Thus the web plate 6 is clamped between the comb-like upper portion 79 and the lower portion of the latch 81. As soon as the web plate 6 is held in position or welded, the clamping devices 79, 80 can be removed again.

Figure 37:
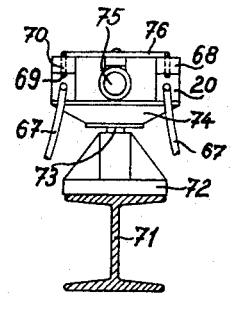
FIG. 37 is a plan view showing a lifting device by means of which the ledges shown in FIGS. 33 and 34 are urged against the girder webs.
Figure 38:
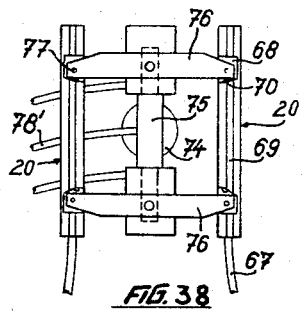
FIG. 38 is a corresponding cross-section.

A girder 71, which is described in detail with reference to FIG. 37, on which is arranged a pedestal bearing 72 with a lifting cylinder 73 is situated below the working position b. The piston of the lifting cylinder 73 has a supporting plate 74 connected thereto on which the ledges 20 in accordance with FIGS. 33 and 34, are mounted. A horizontal double-acting lifting cylinder 75 is provided between these ledges 20 on the supporting plate 74 with traverse-like stirrups 76 being connected to the piston of the cylinder 75, blocks 68, in accordance with FIGS. 33 and 34, being journalled at 77 on the ends thereof. When an individual web plate 6 is to be welded, then the lifting cylinder 73 is first urged upwardly so that the ledges 20 strike against the underside of the flanges of the girder sections 3a, 3b. The lifting cylinder 75 is then caused to retract resulting in the blocks 68 abutting against the front and rear end faces of the webs and the web plate 6. The web plate 6 can now be welded in position. It may also be advisable to use copper rolls in place of the ledges 20, which rolls are on the same level as the welding head 38; these rolls have a groove-chaped notch provided therein to form the underside of the welding seam.

For producing tapering honeycomb girders a device of the type shown in FIGS. 39 to 41 is recommended. In this structure, at least two bearing supports 60a and 60b are adjustable relative to the longitudinal stringers by means of hydraulic presses 99 mounted in a bearing 100. Conveying rollers 45a, 45b of one side are of divided construction and hence each individual part 45a and/or 45b is independently mounted on the shafts, the distance between these parts may be varied by choice. A guiding device 101 situated between the supports 60a and/or 60b is pivotally journalled to these supports 60a and/or 60b at points 102 and 103. In this manner any angular position of the guiding device 10 relative to the fixed row of supports 60 is obtained; it being possible to provide slots in the device 101 for adaptation to different angular positions. The other bridge 61, between the bearing supports 60 in this device, is conveniently arranged to be fixedly located.

As shown in FIGS. 39 and 40, the further the girder sections 3a, 3b are displaced to the right, the closer will the bearing supports 60a and 60b have to be moved in the direction of the fixed support 60. The step by step or continuous displacement of these bearing supports 60a and 60b is effected in synchronism with the advancing movement of the girder sections 3a, 3b. It is evident from the discharge of the driving shafts 47′ and 47″ shown in FIG. 40, to what extent the bearing supports 60a, 60b are adapted to be displaced on the guide bed 59.

An alternative device to the one shown in FIGS. 39 and 40 is shown in FIG. 41 and consists in a bearing support 60c pivotally mounted in a bearing 104. Thus it is possible for this bearing support 60c to be brought into the position in which the flat surface of the conveying roller 45 assumes a position parallel to the flange plane of the girder section 3b. In this case it is unnecessary for this conveying roller pair 45 to be divided.

Conveying rollers 105 are provided the axis of which extends vertically in other bearing supports 60b. These rollers 105 need not be driven; it suffices for them to be in the form of guide rollers. The two girder sections 3a, 3b are first manually tacked together at the end with the maximum depth of web, they are then moved automatically in a continuous or step by step manner. The conveying roller 45′ of the fixed support 60 besides the rollers 45, 46 alone takes over the continued conveying since, due to the previous tacking, the whole honeycomb girder is shifted, even if the conveying rollers 45′ and 46 act upon one girder section 3a only.

It is explained with reference to FIG. 42, how honeycomb girders can be produced, one end of which is tapered outwardly. According to this example the two girder sections 3a, 3b are individually or mutually passed through the guiding device 60 without these girders being welded together. If extension webs 6 are to be welded in, it is possible for them to be previously connected rigidly with the girder section 3a manually or automatically. The freely protruding end of the girder section 3b is then bent at an angle sideways, by means of a pressure cylinder 106, pressure rollers 108, which are connected with piston 107 acting upon the flange of the girder section 3b. Bending of this girder section 3b is effected about a roller 109′. The web plates 6a, 6b 6c are manually welded to the girder section 3b, whereupon the girder is completed in accordance with the methods described. The pressure cylinders 106, can moreover, by means of the links 109, be set in any inclined position.

The production of curved girders of the type shown in FIG. 11 is advantageously effected with a device of the type shown in FIGS. 43 to 44. Several block-like shapes 111 are mounted on a working plate 110 between each of which shapes 111 a space is left. Distance elements 112 are provided between two opposite parallel shapes 111. These shapes 111 are mounted in an arcuate line which corresponds to the subsequent shape of the girders 3a, 3b to be welded, the distance between the shapes 111 being so dimensioned as to enable the webs 5 of the girder sections 3a, 3b to be introduced into this free space. These girder sections 3a, 3b are now pressed into the shapes 111 by means of curved girders 113 and 114 which are driven by means of hydraulic or pneumatic presses 115, 116. At first the curved girder 114 is advanced in the direction of the shapes 111, causing the center region of the girder section 3b to deflect. Pressure stirrups 117 are connected with the curved girder 114, the front ends of the stirrup acting upon the flange of the girder section 3a. As the ends of this girder section 3a are held against stops 118, the centre region of the girder section 3a, when the curved girder 114 is advanced, is moved to beyond the shapes 111, whereupon this girder section 3a is pressed on to the working plate 110. It is now possible for both curved girders 113 to be moved further in the direction of the shapes 111 until the webs of the girder sections 3a, 3b arrive in the free spaces between the shapes and finally are situated opposite one another in register. The curved girder can now be welded together. FIG. 45, by way of a complementary view, also shows the mounting of the pressure stirrups 117 on the curved girder 114, this pressure stirrup 117 being mounted so as to be pivoted about a point 120. A bore 119 serves the rigid fixing of the stirrup 117 on the curved girder 114. Over and above this it is advisable to provide separate centering elements in the center of the row of shapes 111 or on the shaping girders 113, 114 to allow the girder sections 3a, 3b to find their way more readily into the gaps between the blocks.

Figure 46:
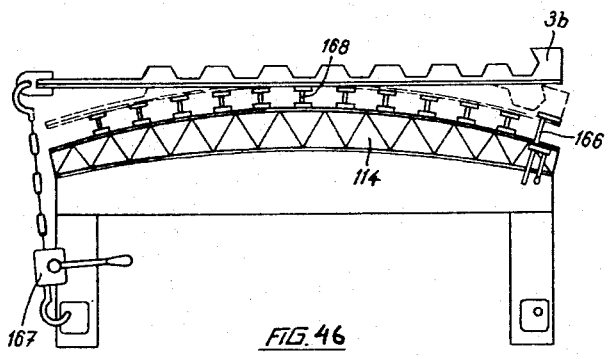
FIGS. 46 to 49 show further examples of devices for producing curved honeycomb girders as alternatives to FIGS. 43 to 45.

If it is desired to save using lifting cylinders 115, 116 as shown in FIG. 43, it is possible for the individual honeycomb girder section 3b to be held on one side by means of clamping brackets 166 on a shaping girder 114 and on the other side to be deflected by means of a block and tackle 167 (FIG. 46). It is also possible for blocks and tackles to be provided on either side.

FIG. 41 moreover shows the general conception of producing with a single shaping girder 114 curved girder sections 3a, 3b having different radii of curvature or curvatures deviating from circular shape, by the insertion between the girder section 3b and the shaping girder 114 of distance elements 168 of any kind or shape. In the present case the elements 168 serve to form a curved girder with a larger radius.

A further alternative of a suitable device for producing curved girders is shown in FIG. 42 and consists in that the girder sections 3a, 3b are slid into guide roller pairs 135 and for the lifting cylinder 136 in approximate circular arrangement to be actuated until the desired shape of curved girder has been formed. The roller pairs 135 are thus connected with the pistons of the cylinders by means of girders 169.

Figure 49:
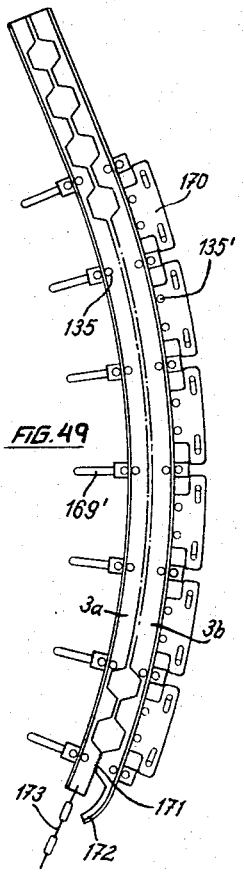

It is also possible to arrange the roller pairs 135 in a circular or curved track, for which purpose the roller pairs 135 are adjustably guided in radial slots 169′ of a supporting device (FIG. 49). Between the individual roller pairs it is possible to provide bridges 170 including further articulatedly arranged guide rollers 135′. The two girder sections 3a, 3b are tacked together at one end at 171 before being introduced into the roller track 135, 135′. The outer girder section 3b at this end is provided with a runner-shaped angle 172, which ensures that the girder sections slides reliably along the outer rollers 135′. The attached girder sections with one pull can now, for example, by means of the pulling chain 173, be drawn through the roller track 135, 135′. It is also possible for the girder to be pushed or for some of the roller pairs 135 on the inside to be adapted as conveying rollers.

Figure 47:
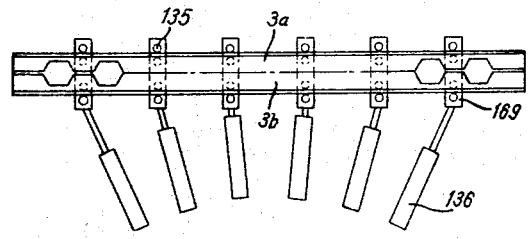
Figure 48:
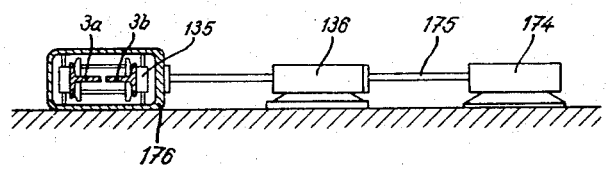

In the event of lifting cylinders of the kind shown in FIG. 47 being used it is possible in accordance with FIG. 48 to operate in multistage manner. A cylinder 136 is displaceably guided on the working device and adapted to actuate, via a trestle 176, the roller pairs 135 in which the girder sections 3a, 3b are guided. The displaceable cylinder 136 is connected with a second stationary lifting cylinder 174 by means of a connecting rod 175. It is however also possible to use cylinders with pistons of telescopic design.

In the event of a welding line not being parallel to the longitudinal axis of the girder it is preferred to use welding devices of the type shown in FIGS. 50 to 52. In FIG. 66 the case is assumed that a curved girder is to be welded, a rail track 125 being provided alongside the working table a bogie 123 being adapted to roll, by means of the wheels 124 along the track 125. The welding device 38 is adapted to be transversely displaceable on this bogie 123 by means of a carriage 121 and wheels 122, so that the carriage can be transversely displaced during the movement of the bogie 123.

An alternative to this movement is shown in FIG. 51, it being assumed that motor 129 is mounted on the bogie 123, a spindle 128 which is mounted in the pedestal bearing 132 being adapted to be turned via gears 130, 131 of the motor. The welding device 38, by way of the stirrup 127, is mounted on the one side on this spindle 128 and on the other side is adapted to be axially displaced via a bearing nut 127' when this spindle is rotated. For this purpose it is advisable to provide the spindle with a buttress thread and to secure the stirrup against tilting.

In the event of the welding seam extending parallel to the longitudinal direction of the welding direction and another welding seam having to be laid at an angle thereto, the arrangement shown in FIG. 52 provides for a fixed welding device and for a welding device 38' adapted to be displaced at right angles, which is adjustable at the slide 126 by means of a separate drive. Such an embodiment is suitable, in particular, for welding tapering honeycomb girders with inserted web plates 6 of the type shown in FIG. 7.

It is also possible however to provide supports having guide rails in the form of suspension tracks for moving the welding unit.

Complementary to the elements shown in the figures, reference is made to the fact that it is also possible to connect a milling cutter with the guiding device 60 or the welding device 38, with which to mill the edges of the webs of the girder sections 3a, 3b before these web edges are welded together. It is moreover possible for a sandblast apparatus and a spraying device to be connected to this guiding and welding device, wherein the welded girders are completed ready for marketing.

When cutting solid-web girders 1 it may occur that the cutting line 2 (FIG. 1) extends laterally and is inaccurate. This inaccurate cutting line would have to be followed by the welding head 38 in order to obtain a reliable weld.

For this reason a centering device 144 is provided in FIGS. 53–55, which operates in advance of the movement of the welding head 38 thus setting a guide track 143 of the welding unit into the correct position. Herein there is provided at least one rotatably mounted disc 177 which, when a trestle 178 is displaced, moves into the gap between the webs 5 of two girder sections. Thus a plate 179, provided with the guide track 143, is adjusted according to the position of the gap relative to a fixed base 180 by means of guide wheels 181. As soon as the discs 177 have passed the gap, cross-bars 179' are tightened thus permitting the welding unit 38 to be moved along the straightened guide track 143 via similar guide wheels 181'. It is however also possible for the discs 177 to be connected with the welding unit 38 so that the latter can also be guided during the movement thereof.

There is shown moreover how the welding seam is formed advantageously in order to carry out a high quality welding. As shown in FIGS. 56 and 57 it is explained that it is an advantage for the start 139 and the end 140 of the welding seam to be welded at half the welding current power and at half the feeding rate of the welding head 38, whereas the longer centre portion 138 of the welding seam is pliantly produced. It is herewith recommended to pass repeatedly over the start and end welling points 139, 140, for example, with a circulating motion, and if necessary to lift it slightly repeatedly. The advantage of these steps consists in preventing the penetration of the welding seam and the formation of craters.

FIG. 58 shows, by way of example, how this movement of the welding head 38 can be carried out in accordance with FIGS. 56 and 57. On a bogie 141 which moves by means of guide wheels 37 and the rollers 37' on the girder sections 3a, 3b or on a separate guide track, there is arranged a couple gearing 137 comprising a crank 182, pinion 184 and an electric motor 185, on the couple of which the welding unit 38 is mounted. This couple gearing 137 is actuated when the welding head is located over the starting points 139 and 140 of the welding seam (FIGS. 56 and 57). The bogie may thus remain inoperative or also have a slow possibly reciprocating feed movement imparted thereto. Moreover the welding head may carry out a circulatory or oval closed movement path and adapted by means of a cam to be readily raised and lowered.

On the bogie 141 moreover there is arranged the driving motor 142 for driving the wheels 37 and rollers 37'. In addition thereto adjustable stops 186 and counter-contacts 187 are provided which serve the automatic control of the advance and reverse of the bogie 141. Such stops may also be provided with advantage in other welding unit constructions.

Figure 59:
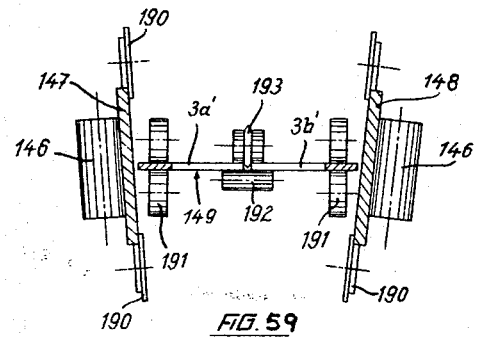
FIG. 59 is a diagrammatic cross-section through a guide roller system for producing honeycomb girders from metal strips.
Figure 60:
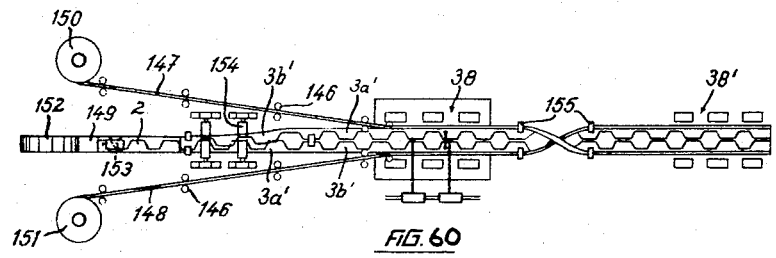
FIG. 60 is a diagrammatic side elevation of an assembly plant producing girders of the type shown in FIG. 59.
Figure 61:
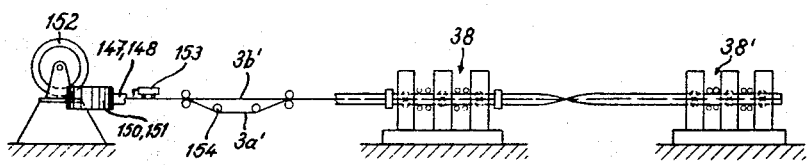
FIG. 61 is a corresponding plan.

It is shown by way of FIGS. 59–61, that it is possible for honeycomb girders to be assembled from strip metal and welded together. In FIG. 59 there is shown how obliquely led chord strips 147, 148 and a web strip 149 is separated in the manner of FIG. 1 is divided into the strip sections 3a' and 3b' The chord strips 147, 148 are guided by rollers 146 and 190, which can be adjusted in accordance with the inclination of these strips. The web strips 3a' and 3b' are guided by means of the roller pairs 191 and guide rollers 192 and 193, the roller 193 simultaneously forming the clearance between the web strips 3a', 3b'. The inclination of the chord strips 147, 148 is significant when, after welding on one side, shrinkage stresses are to be feared. The inclined position then approximately corresponds to the extent of distortion of the strips to be expected after shrinkage.

FIGS. 60 and 61 show diagrammatically in side elevation and plan an overall plant for producing such girders it being assumed that the chord strips 147, 148 are wound off drums 150 and 151 and the web strip 149 not yet separated from a drum 152. The welding unit 153, which in known manner separates the web strip 149 along the line 2 is guided on a separate guide track. One web strip 3a' is then raised or lowered and led away to the side by the rollers 154 to such an extent that the web section 5 (see FIG. 3) is axially transposed. The lateral leading off and separation of the two web sections may be effected conveniently by means of slanted guide rollers. The strips 147 and 149 are then lead together in accordance with FIG. 59 and introduced into the welding unit 38, which first effects the welding at one or two positions from above. The strips welded at one side are then turned through 180° in rollers 155, whereupon the underside, which is now turned face upwards, is welded in the welding device 38'. FIG. 60 to simplify illustration, shows the turning of the laminae 147 to 149 in an extremely shortened view. The endless honeycomb girder is then cut into lengths. It is also possible for the girder to be cut already after passing through the first welding unit 38 and then to carry out the second welding operation. The particular advantage of this device consists in the fact that the cutting device 153 can be put out of operation and solid-web girders without honeycomb formation to be produced with any cross-section from metal strips.

Figure 62:
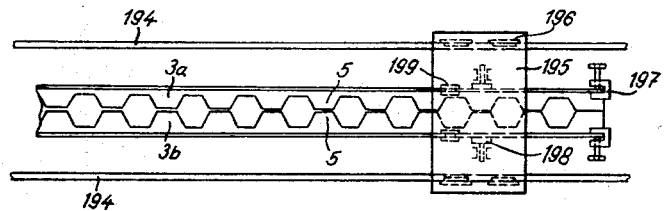
FIG. 62 is a diagrammatic plan of spot welding plant adapted to align the girder sections automatically.
Figure 63:
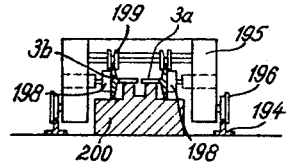
FIG. 63 is a corresponding plan.

FIGS. 62 and 63 show that the invention is not limited absolutely to the apparatus and measures described in the drawing. It is also possible to straighten the individual girder sections 3a and 3b in a straightening machine constantly available in steel works, in order then to arrange them on the supporting trestle. FIG. 67 thus provides clamping means 197 by means of which each individual girder section 3a, 3b is clamped at one end. At the side of the arranged girder section 3a, 3b there is a roller track 194 along which a welding device 195 is adapted to roll by means of wheels 196.

Within the frame 195 there are provided further rollers 199 which, when the frame 195 is displaced, engage on the flanges of the girder sections 3a, 3b and align them parallel to one another. Finally a butt welding machine 198 is arranged in the frame 195 (FIG. 7) composed of two oppositely acting pistons through which the welding current is conducted. The welding unit 195 in this example is progressively advanced and thus to such an extent that the pistons are on the same level with the web sections 5. The pistons 198 are then urged against the flanges of the girder sections 3a, 3b and the welding current conducted therethrough. This causes intense welding at the point of connection of the web sections 5. FIG. 63 moreover shows that the girder sections 3a, 3b are placed on a frame 200 and secured against tilting.

Further alternatives become evident from FIGS. 64–74. The fundamental conception of these figures, consists in the fact that the individual web sections 5' are bent sideways and thus in different directions, thus creating columnar girders. As shown in FIG. 64 it is possible for a flange plate 217 to be fitted at either end of these columnar girders. It is shown, moreover, that the web sections are welded to one another at points 201.

FIG. 65 is based on a normal honeycomb girder of the type shown in FIG. 3, at either end face of which is welded a girder section 3a', 3b' having bent-over web section 5'.

An additional bracing of honeycomb columnar girders constructed in this way can thus be brought about by the fact that additional tubes 202 or other profiles are attached at the welding positions 201, the web sections 5' being welded thereto.

In the example shown in FIG. 68 an individual girder section 3a' with its bent-over web sections 5', is welded to the underside of a U-section girder 204 which can be provided or coated with a concrete filling 205.

As shown in FIG. 67 it is possible for the profile 204 to be substituted merely by a flat plate 203.

A preferred embodiment shown in FIG. 69 consists on the fact that the bent-over web sections 5' of a girder section 3a' is connected with rectilinear girder sections 3a and 3b, a U-section girder 206, also designed as a honeycomb girder, being connected between these rectilinear girder sections 3a, 3b.

FIG. 70 shows an alternative to FIG. 68, it being assumed that in place of the U-section girder 204, a tube 207 is connected with the web sections 5' of the girder section 3a'.

It is possible moreover to construct box girders of the type shown in FIGS. 71–73. As starting material there is used in this case a girder section 3a" and 3b" which has been obtained from a Z-section or U-section honeycomb girder. It is shown herein that two opposite web section pairs 5' at a time, are alternately bent outwardly and inwardly (5"), thus creating a box girder as shown in FIG. 72.

In accordance with FIG. 73, it is however also possible for the individual girder sections 3a" and 3b" to be connected with a solid-web girder 208.

FIG. 74 shows how the individual web sections 5' can be bent-over in a die press, it being assumed that the press is arranged in front of the welding device. An upper die 210 and a lower die 209 are herewith provided with a profiling which corresponds to the bevel of the individual web section 5'. The girder sections 3a, 3b are also laterally retained by means of presses 215 which are mounted in bearings 216. Holding down devices 212 are connected with the upper die 210 which, when the die 210 descends, come to rest on the web of the girder sections 3a, 3b and clamp it down, whereupon the upper die 210 during the continued descent effects the bending-over. The holding down devices 212 are guided in the upper die 210 by means of bolts 214 and by means of springs 213 resiliently mounted. The upper die 210 is adapted to be raised and lowered in the bearing 211.

I claim:

1. A honeycomb girder comprising a pair of girder sections each having an undulating web portion of generally toothed configuration with respective longitudinally offset projections extending in the direction of the other girder section, said web portions being coplanar and spaced apart, at least along a portion of the lengths of said sections with some of the juxtaposed projections being separated from one another by a distance greater than that between others of said projections, and individual spacer plates of progressively varying width disposed between and welded to respective pairs of spaced juxtaposed projections, one of said sections diverging from said other of said sections only along a limited portion of the length of said section and only at an extremity of the honeycombed girder.

2. The girder defined in claim 1 wherein said sections are substantially parallel over the remainder of their lengths.

3. A honeycomb girder comprising a pair of girder sections each having an undulating web portion of generally toothed configuration with respective longitudinally offset projections extending in the direction of the other girder section, said web portions being coplanar and spaced apart at least along a portion of the lengths of said sections with some of the juxtaposed projections being separated from one another by a distance greater than that between others of said projections, and individual spacer plates of progressively varying width disposed between and welded to respective pairs of spaced juxtaposed projections, at least one of said sections being of arcuate configuration over at least part of the lengths of said sections, the other of said sections extending substantially rectilinearly, and said one of said sections being of generally undulating configuration.

4. A method of making a honeycomb girder from a solid-web girder, comprising the steps of:
   (a) cutting through the web of said solid-web girder along a generally undulating line to sever said solid-web girder into a pair of girder sections, each of said sections having a web portion of generally toothed configuration with respective longitudinally offset projections extending in the direction of the other girder section;
   (b) shifting said sections relatively in a longitudinal direction by a distance equal substantially to the spacing between said projections to bring the projection of said sections into substantial juxtaposition;
   (c) advancing said sections simultaneously along a predetermined generally longitudinal transport path;
   (d) gradually spreading said sections apart at a location along said path to separate at least some of the juxtaposed projections from one another by a distance greater than that between others of said juxtaposed projections;
   (e) successively inserting individual spacer plates of progressively varying widths between respective pairs of spaced juxtaposed projections; and
   (f) welding said plates to both projections of the respective pair.

5. The method defined in claim 4 wherein said sections are spread in step (d) by deflecting at least one of said sections alternately toward and away from the other of said sections during movement of said sections along said transport path.

6. The method defined in claim 4 wherein said sections are spread apart in step (d) only along a limited portion of their lengths, said sections being substantially parallel along the remainder of their lengths.

7. The method defined in claim 4 wherein said transport path is arcuate.

8. The method defined in claim 4, further comprising the steps of welding reinforcing bars to said sections at least along the flanks of said projections and along said webs intermediate said projections.

References Cited by the Examiner

UNITED STATES PATENTS

| | | | |
|---|---|---|---|
| 1,644,940 | 10/1927 | Moyer | 29—155 |
| 1,741,423 | 12/1929 | Lachman | 52—636 |

FOREIGN PATENTS

| | | |
|---|---|---|
| 706,311 | 6/1931 | France. |
| 860,340 | 12/1952 | Germany. |
| 498,281 | 1/1939 | Great Britain. |
| 638,689 | 6/1950 | Great Britain. |
| 680,022 | 10/1952 | Great Britain. |

FRANK L. ABBOTT, *Primary Examiner.*

R. S. VERMUT, *Assistant Examiner.*